United States Patent
Suomi

(10) Patent No.: US 7,193,979 B2
(45) Date of Patent: Mar. 20, 2007

(54) METHOD AND APPARATUS FOR USE BY A GPRS DEVICE IN RESPONDING TO CHANGE IN SAPI CONNECTION

(75) Inventor: Arto Suomi, Tampere (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 10/618,266

(22) Filed: Jul. 11, 2003

(65) Prior Publication Data

US 2005/0007981 A1 Jan. 13, 2005

(51) Int. Cl.
*H04Q 7/00* (2006.01)
*H04Q 7/24* (2006.01)

(52) U.S. Cl. ............ 370/328; 370/331; 370/338; 455/436

(58) Field of Classification Search ............... 370/310, 370/328, 331, 338, 400–408; 455/436–452.2
See application file for complete search history.

(56) References Cited

U.S. PATENT DOCUMENTS

| | | | | |
|---|---|---|---|---|
| 6,104,929 | A * | 8/2000 | Josse et al. ............... | 455/445 |
| 6,128,717 | A * | 10/2000 | Harrison et al. ............ | 711/202 |
| 6,219,557 | B1 * | 4/2001 | Havinis .................... | 455/456.4 |
| 6,434,133 | B1 * | 8/2002 | Hamalainen ................ | 370/338 |
| H002051 | H * | 11/2002 | Zhu et al. ............... | 370/395.21 |
| 6,590,905 | B1 * | 7/2003 | Suumaki et al. ............ | 370/466 |
| 6,847,610 | B1 * | 1/2005 | Suumaki et al. ......... | 370/230.1 |
| 6,968,190 | B1 * | 11/2005 | Suumaki et al. ............ | 455/436 |
| 2004/0053623 | A1 * | 3/2004 | Hoff et al. ............... | 455/452.1 |
| 2004/0156331 | A1 * | 8/2004 | Wang ........................ | 370/328 |

OTHER PUBLICATIONS

Ylianttila et al., "Supporting Resource Allocation with Vertical Handoffs in Multiple Radio Network Environment", University of Oulu, Finland, vol. 1 Sep. 2002, IEEE, 0-7803-7589, pp, 64-68.*
Ylianttila et al., "Optimization Scheme for Mobile Users Perfroming Vertical Handoffs between IEEE 802.11 and GPRS/EDGE networks", Oulu University Tutkijantie 2E, Finland, vol. 6 Nov. 2001, IEEE, 0-7803-7206, pp. 3439-3443.*

* cited by examiner

*Primary Examiner*—Chi Pham
*Assistant Examiner*—Tri H. Phan
(74) *Attorney, Agent, or Firm*—Ware, Fressola, Van Der Sluys & Adolphson LLP

(57) ABSTRACT

A method (and corresponding equipment) for use in case of a UE device (18) enabled for communication with other telecommunication devices via a network including a radio access network (17 21) and providing GPRS, the method for use in responding to a message from the network indicating a change in a SAPI connection from an old SAPI to a new SAPI, the method characterized by using a timer to provide that for a period of time set on the timer, the UE device (18) keeps the old SAPI active and handles messages received on both the old SAPI and the new SAPI.

22 Claims, 4 Drawing Sheets

METHOD AND APPARATUS FOR USE BY A GPRS DEVICE IN RESPONDING TO CHANGE IN SAPI CONNECTION

TECHNICAL FIELD

The present invention pertains to the field of General Packet Radio Service (GPRS). More particularly, the present invention pertains to a change in a SAPI (Service Access Point Identifier) connection in a GRPS device, such as a GPRS-enabled cellular telephone.

BACKGROUND ART

General

As shown in FIG. 1, according to 3G WCDMA (Third Generation Wideband Code Division Multiple Access), in communicating via wireless communication a mobile user equipment (UE) 18 interfaces with an UTRAN (universal mobile telecommunications system (UMTS) terrestrial radio access network) 17, and in particular with a Node B 17a (also sometimes called a base station) of the UTRAN 17, over a so-called Uu interface, which can provide a circuit-switched (CS) or packet-switched (PS) connection between the UE and the UTRAN. The UTRAN Node B in turn communicates with an UTRAN radio network controller (RNC) 17b over a so-called Iub interface, and the RNC communicates with a core network (CN) entity 19, either a mobile switching center (MSC) or a serving GPRS (general packet radio system) support node (SGSN) 19a, over a so-called Iu interface, and also communicates with other RNCs over a so-called Iur interface. The Iu interface is more specifically either a Iu circuit-switched interface IuCS between an UTRAN RNC and an MSC, or a Iu packet-switched interface IuPS between an UTRAN RNC and a SGSN.

A corresponding architecture exists in the case of GSM (Global System for Mobile Communications) providing a GSM RAN 21, in which case the UE/RAN interface is called the Um interface, which thus can provide either a CS connection or a PS connection, and it is GPRS that provides the latter. FIG. 2 shows the logical architecture of GPRS in case of a GSM implementation. In case of GSM, the UE interfaces (over the Um interface) with a Base Station System (BSS) 21a of the GSM RAN 21, which in turn interfaces with a SGSN 22a of a GSM core network 22.

GPRS is thus the service offered by the core network by which a UE is provided a PS connection to another device, via the UTRAN or GSM RAN, for communicating with the other device (such as a device connected to the Internet or just another UE) by the exchange of packets. The overall GPRS logical architecture is defined in 3GPP TS 03.60.

In the PS domain, packet connections are called sessions and they are established and managed by an entity called Session Management (SM). SM is a logical entity having two states, inactive and active. In the inactive state, packet data transfer is not possible and routing information (if it exists) is not valid. In the active state, packet data transfer is possible and all valid routing information is present and defined. The protocol used for packet data transfer during an active session is called Packet Data Protocol (PDP). Many different PDPs are possible, including Internet Protocol (IP) (various versions) and X.25.

The SM handles packet session attributes as so-called contexts, i.e. PDP contexts. A PDP context contains all parameters describing a packet data connection, i.e. a connection between two end point addresses and having a prescribed quality of service (QoS). For example, a PDP context holds information such as allocated IP addresses, connection types and related network element addresses. From the service point of view, one PDP context is set up for one packet switch service with a prescribed QoS class. Thus, for example, web surfing and streaming video over a packet connection each have their own PDP context. (In UMTS, per 3GPP R99, QoS classes include: conversational class, streaming class, interactive class and background class.)

The activation of a PDP context causes the SM to change its state from inactive to active. When a PDP context is activated, a UE and the network are able to establish a bearer for data transfer. When the SM is active (and so when a PDP context exists), the existing PDP context can be changed. To change a PDP context, the UE and the network renegotiate packet session characteristics.

Network layer protocols are intended to be capable of operating over services derived from a wide variety of subnetworks and data links. GPRS supports several network layer protocols providing protocol transparency for the users of the service. Introduction of new network layer protocols to be transferred over GPRS is intended to be possible without any changes to GPRS. Therefore, all functions related to transfer of Network layer Protocol Data Units (N-PDUs) (including control data and possibly user data) are intended to be carried out in a transparent way by GPRS network entities. When GPRS is used over GSM RAN, it is a function of the so-called GPRS SNDCP (subnetwork dependent convergence protocol) layer, a protocol layer using the services of the logical link (protocol) layer (LLC) as shown in FIG. 3, to provide such transparency. Another function of SNDCP is to improve channel efficiency. This requirement is fulfilled using compression techniques.

As shown in FIG. 4, the protocol entities above SNDCP (i.e. using the services of SNDCP) are various commonly used network protocols, or more particularly packet data protocols (such as IPv4 and IPv6). A SNDCP entity performs multiplexing of data coming from different PDPs for transmission using (the service provided by) the LLC layer. The Network Service Access Point Identifier (NSAPI) is an index to the PDP context of the PDP that is using the services provided by SNDCP (a service access point being a conceptual point where a protocol layer offers to an upper protocol layer access to its services). One PDP may have several PDP contexts and NSAPIs. However, it is possible that each allocated NSAPI is used by a different PDP. Each active NSAPI is required to use the services provided by the Service Access Point Identifier (SAPI) in the LLC layer. Several NSAPIs may be associated with the same SAPI.

FIG. 5 illustrates the service access points through which service primitives used for communication between the SNDCP layer and other layers are carried out. The primitives provided by the SNDCP layer (to PDPs) are listed in Table 1.

TABLE 1

| SNDCP layer service primitives. | | | | | |
|---|---|---|---|---|---|
| Generic | Type | | | | |
| Name | Request | Indication | Response | Confirm | Parameters |
| SNDCP User (PDP or the SGSN Relay) ↔ SNDCP | | | | | |
| SN-XID | X | X | — | — | Requested SNDCP XID Parameters |

TABLE 1-continued

SNDCP layer service primitives.

| Generic Name | Type | | | | Parameters |
|---|---|---|---|---|---|
| | Request | Indication | Response | Confirm | |
| SN-XID | — | — | X | X | Negotiated SNDCP XID Parameters |

For example: a SN-XID REQUEST primitive is a request used by the SNDCP user at the initiating entity to deliver the list of requested XID parameters to the peer entity; a SN-XID INDICATION is an indication used by the SNDCP entity to deliver the list of requested XID parameters to the SNDCP user; a SN-XID RESPONSE is a response used by the SNDCP user to deliver the list of negotiated XID parameters to the peer entity; and a SN-XID CONFIRM is a confirmation used by the SNDCP entity to deliver the list of negotiated XID parameters to the SNDCP user.

The SNDCP layer uses the service primitives provided by the SM sublayer and the LLC layer shown in Table 2. SM is specified in 3GPP TS 04.08 and LLC in 3GPP TS 04.64.

confirmation used by the LLC layer to deliver the negotiated SNDCP XID parameters to the SNDCP layer.

Also, and more importantly for the present invention, a SNSM-MODIFY INDICATION is an indication used by the SM entity to trigger change of the QoS profile (see 3GPP TS 04.08) for a NSAPI and an indication of the SAPI to be used. It is also used by the SM entity in the SGSN to inform the SNDCP entity that a NSAPI is to be created, together with the (re-)negotiated QoS profile, the SAPI assigned, and, in the MS, the radio priority level to be used by RLC (radio link control)/MAC (media access control). A SNSM-MODIFY RESPONSE is a response used by the SNDCP entity to inform the SM entity that the indicated NSAPI and QoS profile are now in use and the acknowledged peer-to-peer LLC operations for the appropriate SAPIs are established and/or released, if necessary.

Problem(s) Addressed by the Invention

As indicated above, the GPRS protocol architecture consists of various protocol layers. The operation of each layer is specified in detail in corresponding documents, however, the cooperation of these layers is not yet well specified. One problem is the cooperation between the SNDC layer and the LLC. As indicated above, SNDC handles PDP contexts and

TABLE 2

Service primitives used by the SNDCP entity.

| Generic Name | Type | | | | Parameters |
|---|---|---|---|---|---|
| | Request | Indication | Response | Confirm | |
| SNDCP ↔ LLC | | | | | |
| LL-RESET | — | X | — | — | TLLI |
| LL-ESTABLISH | X | — | — | — | TLLI, XID Requested |
| LL-ESTABLISH | — | X | — | — | TLLI, XID Requested, N201-I, N201-U |
| LL-ESTABLISH | — | — | X | — | TLLI, XID Negotiated |
| LL-ESTABLISH | — | — | — | X | TLLI, XID Negotiated, N201-I, N201-U |
| LL-RELEASE | X | — | — | — | TLLI, Local |
| LL-RELEASE | — | X | — | — | TLLI, Cause |
| LL-RELEASE | — | — | — | X | TLLI |
| LL-XID | X | — | — | — | TLLI, XID Requested |
| LL-XID | — | X | — | — | TLLI, XID Requested, N201-I, N201-U |
| LL-XID | — | — | X | — | TLLI, XID Negotiated |
| LL-XID | — | — | — | X | TLLI, XID Negotiated, N201-I, N201-U |
| SNDCP ↔ SM | | | | | |
| SNSM-ACTIVATE | | X | — | — | TLLI, NSAPI, QoS profile, SAPI, Radio Priority |
| SNSM-ACTIVATE | — | — | X | | TLLI, NSAPI |
| SNSM-DEACTIVATE | — | X | — | — | TLLI, NSAPI(s), LLC Release Indicator |
| SNSM-DEACTIVATE | — | — | X | — | TLLI, NSAPI |
| SNSM-MODIFY | — | X | — | — | TLLI, NSAPI, QoS Profile, SAPI, Radio Priority, Send N-PDU Number, Receive N-PDU Number |
| SNSM-MODIFY | — | — | X | — | TLLI, NSAPI |

For example: a LL-XID REQUEST (primitive) is a request used by the SNDCP layer to deliver the requested SNDCP XID parameters to the LLC layer; a LL-XID INDICATION is an indication used by the LLC layer to deliver the requested SNDCP XID parameters to the SNDCP layer; a LL-XID RESPONSE is a response used by the SNDCP layer to deliver the negotiated SNDCP XID parameters to the LLC layer; and a LL-XID CONFIRM is a each context has a NSAPI number; there can be up to eleven parallel PDP contexts. LLC handles logical links, and each logical link has its own SAPI number; there can be up to four parallel logical links. As mentioned, one NSAPI can be mapped to only one SAPI at any one time, i.e. one NSAPI corresponds to only one NSAPI, but several NSAPIs can be mapped to the same SAPI, i.e. one SAPI may correspond to several NSAPIs. The network controls the mapping between contexts of SAPIs and NSAPIs and it is possible for the network to change the mapping on the fly. PDP contexts having different QoS profiles must be placed in separate SAPIs. SNDC level compression algorithms are negotiated using LLC level procedures (using so-called XID negotiation).

3GPP LLC specification 04.64 says that LLC messages received on a SAPI not mapped to a PDP context can be discarded. However, SNDC specification (04.65) says that after a context modification procedure, the network should in certain cases start XID (context identifier) negotiation and/or a logical link disconnection procedure using the old SAPI. This causes a conflicting situation, i.e. the network sends LLC messages that the mobile side is allowed to discard. Depending on the network implementation, this can cause a long break in the data transfer or even PDP context deactivation.

The easiest solution is to keep all LLC links active at all times. However, this has a negative memory consumption effect since the data structures need to be reserved for all SAPIs. Another solution is to not really support four parallel independent LLC links. This solution is fine if you support one PDP context only, or if the network always maps all NSAPIs to one SAPI, but it does not work when you have several contexts that need separate SAPIs (because of different QoS). A third alternative is to allow mapping of one NSAPI to two SAPIs until LLC link disconnection procedure and/or XID negotiation for the old SAPI has taken place. However, it is possible that the network does not perform the link disconnection procedure or XID negotiation at all, and in that case the old SAPI would be left active.

What is needed is a procedure (protocol) according to which in case of a mobile receiving a PDP context modification message, the mobile does not discard at least some of the LLC messages sent by the network, at least not for a time deemed long enough that no significant break in data transfer is likely, nor is PDP context deactivation.

DISCLOSURE OF THE INVENTION

Accordingly, in a first aspect of the invention, a method is provided for use by a user equipment (UE) device enabled for communication with other telecommunication devices via a network including a radio access network and providing general packet radio service (GPRS), the method for use by the UE device in responding to a message from the network indicating a change in a service access point identifier (SAPI) connection from an old SAPI to a new SAPI, the method characterized by: a step, responsive to an indication from the network of a change from the old SAPI to the new SAPI, of setting a timer for a period of time; and a step of terminating the old SAPI.

In accord with the first aspect of the invention, in the step of terminating the old SAPI, the old SAPI may not terminate until after the period of time expires, and the period of time may be predetermined to be long enough for the network to send to the new SAPI a message providing compressions for the new SAPI.

Also in accord with the first aspect of the invention, the timer period may be set to approximately 15 seconds.

In a second aspect of the invention, a computer program product is provided comprising: a computer readable storage structure embodying computer program code thereon for execution by a computer processor in a UE device, with said computer program code characterized in that it includes instructions for performing the steps of the method according to the first aspect of the invention.

In a third aspect of the invention, a telecommunication device is provided enabled for communication with other telecommunication devices via a network including a radio access network and providing general packet radio service (GPRS), the telecommunication device adapted for responding to a message from the network indicating a change in a service access point identifier (SAPI) connection from an old SAPI to a new SAPI, the telecommunication device characterized by: means, responsive to an indication from the network of a change from the old SAPI to the new SAPI, for setting a timer for a period of time; and means for terminating the old SAPI.

In accord with the third aspect of the invention, the means for terminating the old SAPI may be so adapted that the old SAPI is not terminated until after the period of time expires, with the period of time predetermined to be long enough for the network to send to the new SAPI a message providing compressions for the new SAPI.

In a fourth aspect of the invention, a telecommunication system is provided comprising a telecommunication device and a network including a radio access network and providing GPRS, wherein the telecommunication device is as provided by the third aspect of the invention.

In a fifth aspect of the invention, a method is provided for use by a telecommunication network in communicating with a user equipment (UE) device enabled for communication with other telecommunication devices, the network including a radio access network and providing general packet radio service (GPRS), the method for use in indicating to the UE device a change in a service access point identifier (SAPI) connection from an old SAPI to a new SAPI, the method including: a step of providing to the UE device a request to change to the new SAPI; a step of removing compressions from the old SAPI; and a step of providing compressions for the new SAPI; the method characterized by the network continuing to provide messages for the old SAPI after providing to the UE device the request to change to the new SAPI and also providing messages for the new SAPI.

In a sixth aspect of the invention, a telecommunication network is provided adapted for communicating with a user equipment (UE) device, the network including a radio access network and providing general packet radio service (GPRS), the telecommunication network adapted for indicating to the UE device a change in a service access point identifier (SAPI) connection from an old SAPI to a new SAPI, the telecommunication network including: means for providing to the UE device a request to change to the new SAPI; means for removing compressions from the old SAPI; and means for providing compressions for the new SAPI; the telecommunication network characterized by the network continuing to provide messages for the old SAPI after providing to the UE device the request to change to the new SAPI and also providing messages for the new SAPI.

In a seventh aspect of the invention, a system is provided comprising a UE device and a telecommunication network including a radio access network and providing GPRS, wherein the telecommunication network is according to the sixth aspect of the invention.

Thus, according to the invention, when the mobile receives a PDP context modification message from the network indicating that a NSAPI that was mapped to an old SAPI is now to be mapped to a new SAPI, the mobile starts a timer to expire after some timer period. During the timer period, the old LLC SAPI is kept alive and all messages received on the old SAPI are handled, and messages received on the new SAPI are also handled; thus, during the timer period, the mobile has two SAPIs active. When the timer period expires, the old SAPI is deleted, and after that all messages received on the old SAPI are discarded.

The invention is advantageous in that it uses relatively little of the memory resources of a mobile, and also in that is guarantees compatibility with different network implementations.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
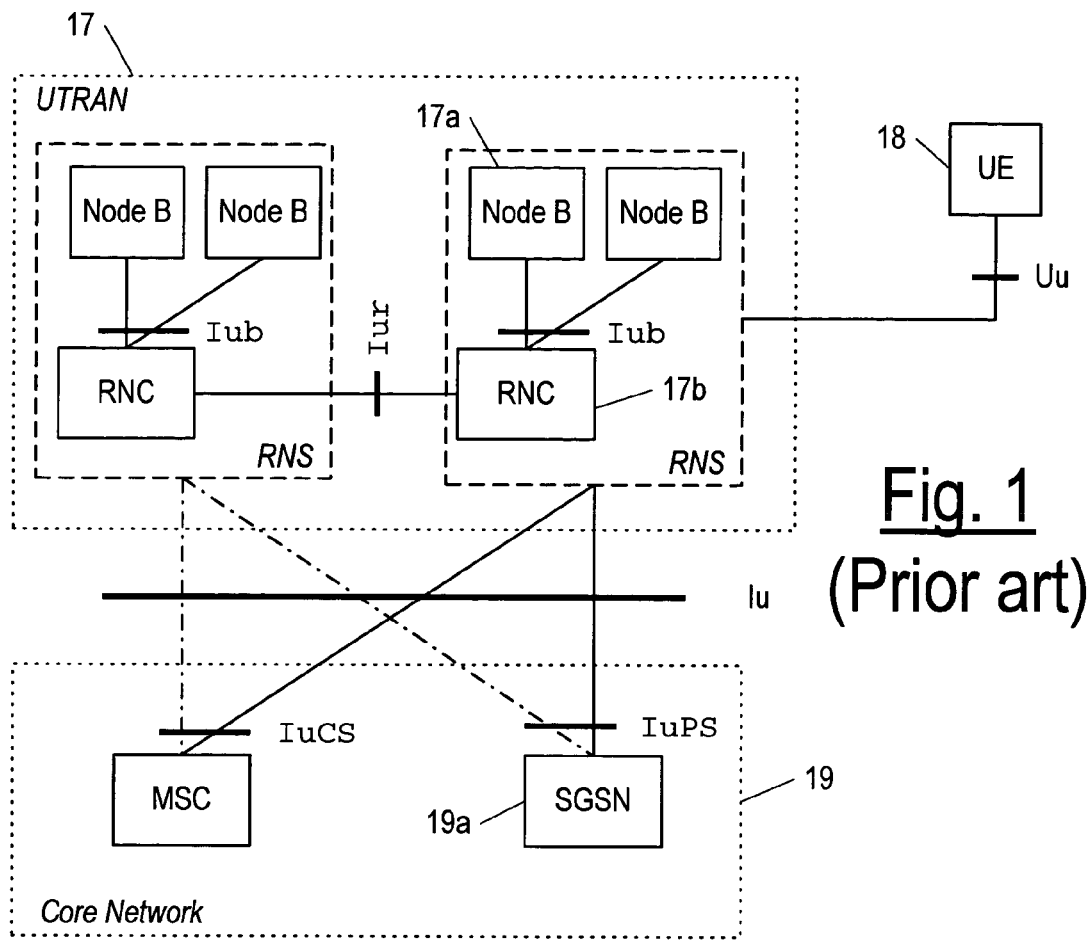
FIG. 1 is a block diagram/flow diagram of an UMTS telecommunication system providing GPRS, according to the prior art.
Figure 2:
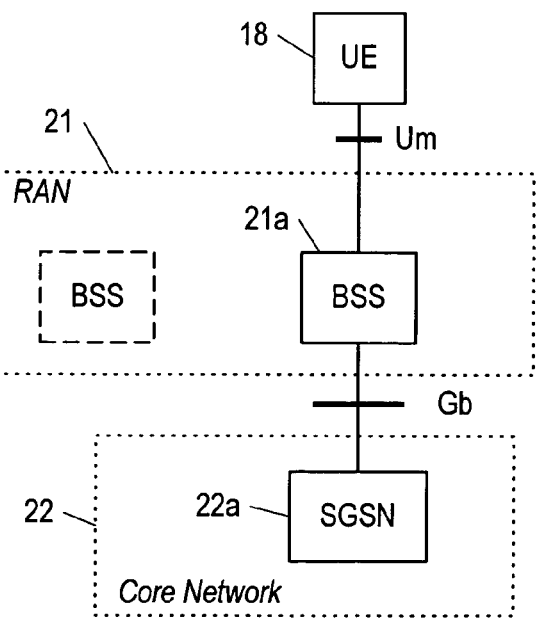
FIG. 2 is a block diagram/flow diagram of a GSM telecommunication system providing GPRS, according to the prior art.
Figure 6:
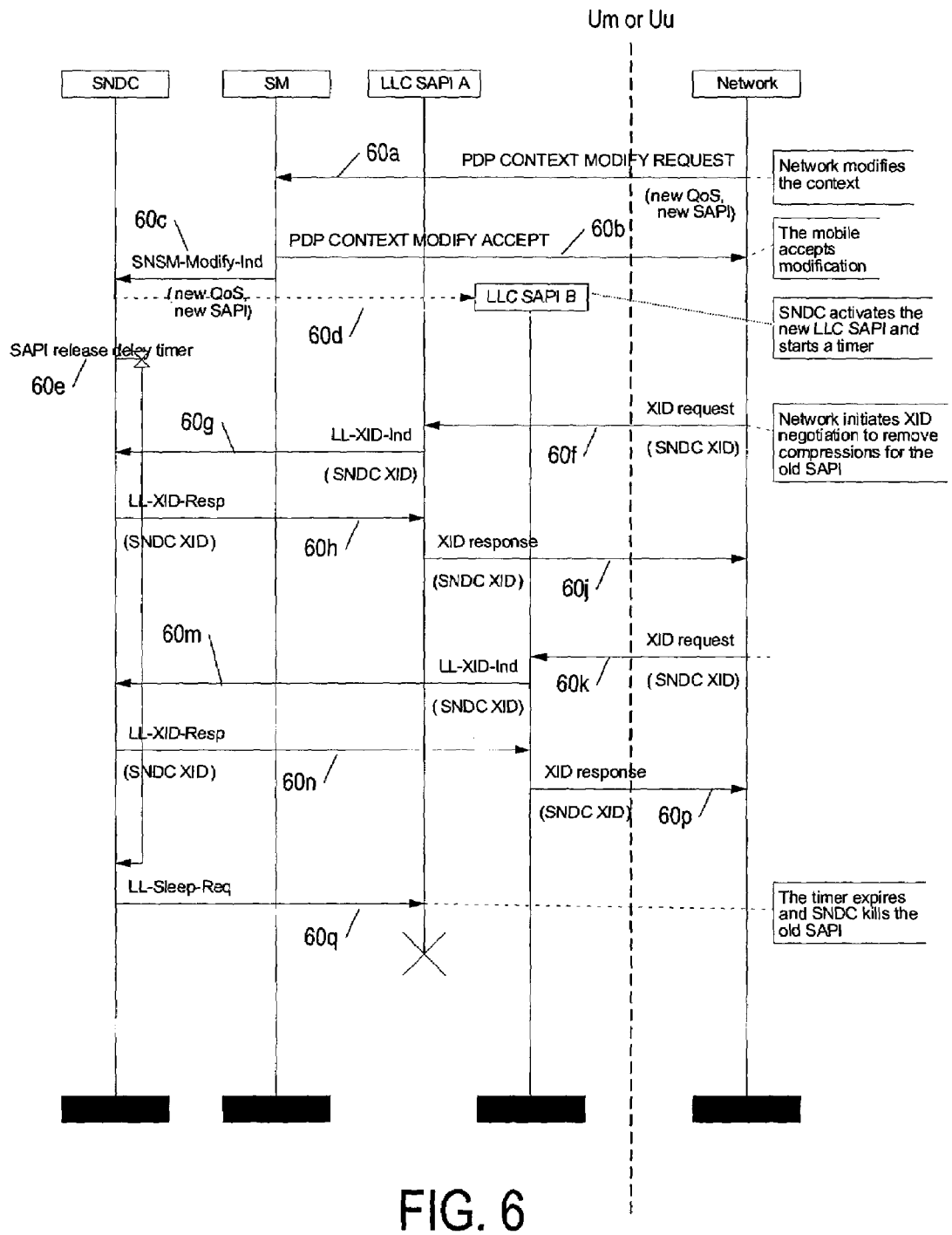
FIG. 6 is a message sequence diagram according to the invention.

Referring now to FIGS. 1, 2, and 6, the invention provides a method for use by a telecommunication device 18—i.e. a so-called user equipment (UE) device—enabled for communication with other telecommunication devices (not shown) via a telecommunication network including a core network 19, 22 and a radio access network (RAN) 17 21 and adapted to provide GPRS (General Packet Radio Service), the method for use in responding to a message from the network (either originating in the core network 19, 22 or in the RAN 17 21, but provided by the RAN 17 21) indicating a change in a SAPI (service access point identifier) connection from an old SAPI to a new SAPI, the method including steps 20e 20r that provide for keeping the old SAPI active for a period of time during which the device 18 handles messages received on the old SAPI as well as messages received on the new SAPI.

Figure 3:
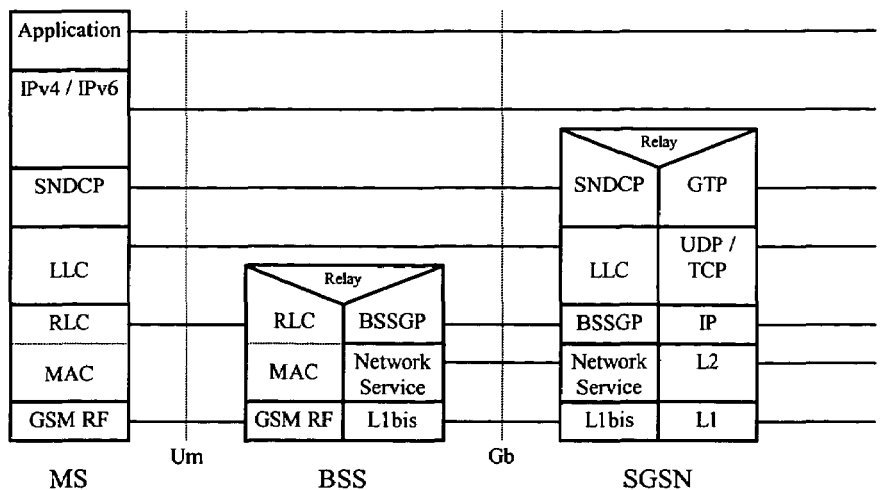
FIG. 3 is a schematic of the GPRS protocol stack, including an SNDCP layer and a LLC layer.
Figure 4:
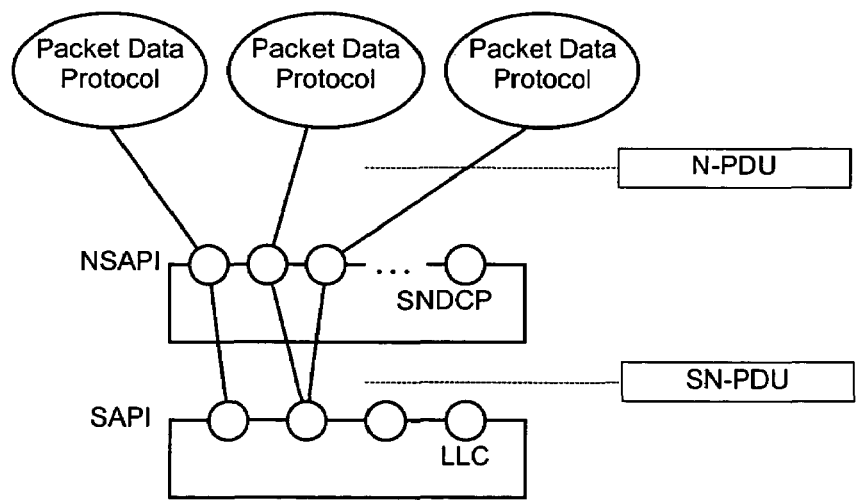
FIG. 4 is a schematic illustrating SNDCP multiplexing of different protocols.
Figure 5:
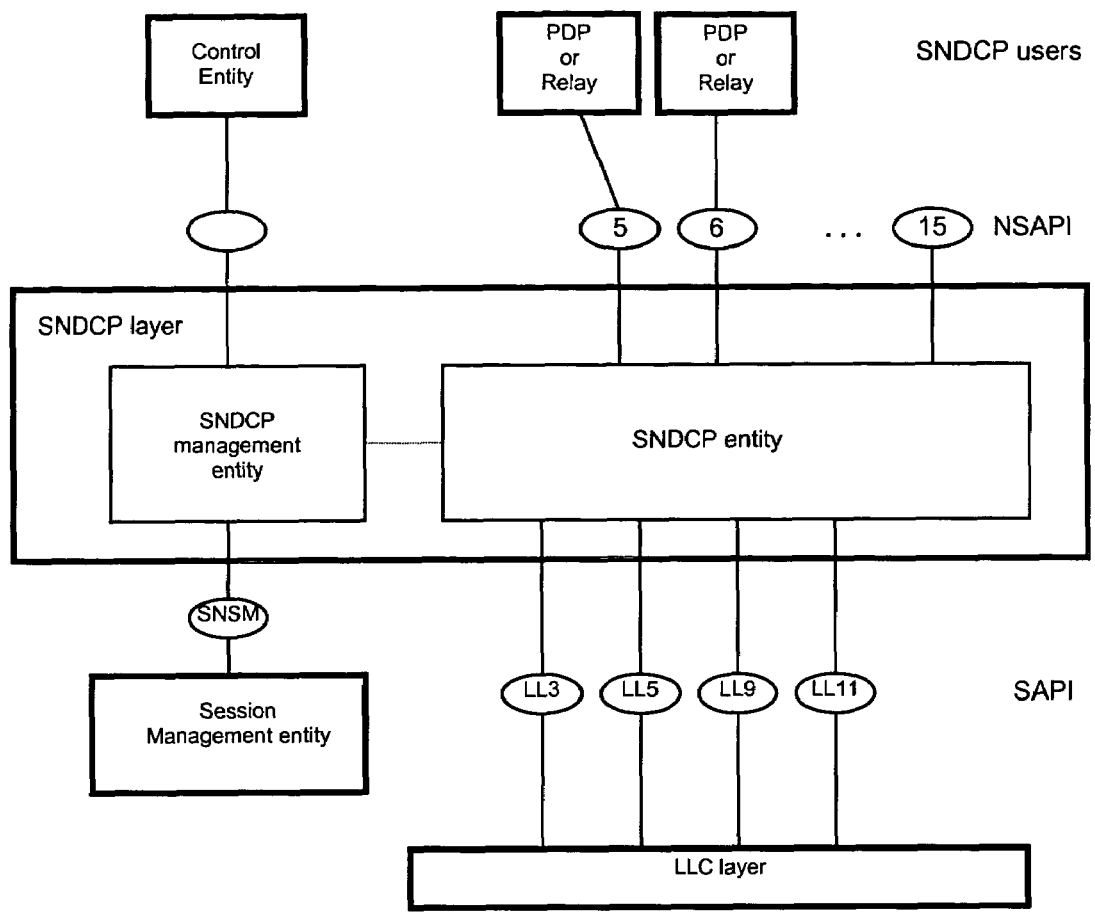
FIG. 5 is a schematic illustrating the service access points through which service primitives used for communication between the SNDCP layer and other layers are carried out.

Referring now especially to FIG. 6, operation according to the invention of the UE device 18 (FIG. 1) is shown as including a first step 60a in which the UE device—and more specifically, the session management (SM) entity of the UE device—receives from the RAN 17 21 a PDP CONTEXT MODIFY REQUEST corresponding to a change to the PDP context made by the network (either the RAN or the core network 19 22). The change provides a new QoS and a new logical link layer (LLC) SAPI (FIG. 4); more specifically, the change in SAPI is from an old SAPI, indicated as (LLC) SAPI-A, to a new SAPI, indicated as (LLC) SAPI-B. In a next step 60b, assuming here that the UE device agrees to the change, the SM of the UE device sends to the network a PDP CONTEXT MODIFY ACCEPT message, and then, in a next step 60c, sends to the SNDCP (subnetwork dependent convergence protocol) layer (FIGS. 3–5) of the UE device a so-called SNSM MODIFY INDICATION message indicating the new QoS and SAPI. In a next step 60d, the SNDC (i.e. the SNDCP layer) activates the new (LLC) SAPI (SAPI-B) and also, in a next step 60e, starts a timer. A timer period of approximately 15 seconds is typical; it is long enough for a new SAPI to be fully activated, i.e. it is long enough for the UE device to receive from the network a message providing compressions for the new SAPI.

At this point, both the old SAPI (SAPI-A) and the new SAPI (SAPI-B) are active. Now, in a next step 60f, the network sends a XID REQUEST message to SAPI-A, thus initiating XID negotiation to remove compressions for the old SAPI (SAPI-A). (SNDC XID negotiation is piggybacked in LLC XID messages, which is why in FIG. 6 the parenthetical annotation SNDC XID is included with message 60f as well as each subsequent XID-related message. Of course a LLC XID message can also include the LLC's own parameters, but as these are not relevant for understanding the invention, they are not shown in FIG. 6.)

Upon receipt of the XID REQUEST, in a next step 60g SAPI-A sends a so-called LL XID INDICATION message to the SNDC. In a next step 60h, SNDC sends to SAPI-A a LL XID RESPONSE (acknowledging the LL XID INDICATION), and in a next step 60j, SAPI-A forwards the acknowledgment on to the network as a XID RESPONSE message.

Now, instead of terminating the old SAPI (SAPI-A) at this point in the change procedure, according to the invention the UE device handles messages to both the old SAPI (SAPI-A) and the new SAPI (SAPI-B) until the timer expires. Thus, during this time, the network continues to provide messages for the old SAPI and also provides messages for the new SAPI.

Soon after receiving the forwarded XID RESPONSE message from the old SAPI (SAPI-A), the network sends a XID REQUEST to the new SAPI (SAPI-B) in a next step 60k, thus providing compressions for the new SAPI. Then, in a next step 60m, the new SAPI sends a LL CID INDICATION message to SNDC, which in a next step 60n responds to the new SAPI with LL XID RESPONSE acknowledging the message. In a next step 60p, the new SAPI forwards the XID RESPONSE to the network. Finally, in a next step 60q, after the timer expires, the SNDC terminates the old SAPI by sending it a LL SLEEP REQUEST.

The invention uses a timer to avoid losing messages instead of relying on handshaking with the new SAPI, i.e. instead of having the SNDC, once aware that a new SAPI is being created, periodically interrogate the new SAPI to determine when the new SAPI is ready to receive messages. Handshaking cannot be relied on because XID negotiation on the new SAPI is optional: if the network does not want to use compressions, it does not have to send a XID at all. In such an instance, the new LLC SAPI is ready for data transmission immediately after step 60c (in which SNDC receives an SNSM MODIFY INDICATION) and the timer of the invention is not needed, but of course can still be used without causing a problem. If XID negotiation (or some other handshaking) were mandatory before data transmission over a LLC SAPI, handshaking could be used instead of a timer.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a user equipment device enabled for communication with other telecommunication devices via a network including a radio access network and providing general packet radio service, the method for use by the user equipment device in responding to a message from the network indicating a change in a service access point identifier connection from an old service access point identifier to a new service access point identifier, the method comprising:
   the user equipment device, in response to an indication from the network of a change from the old service access point identifier to the new service access point identifier, setting a timer for a period of time; and
   the user equipment device terminating the old service access point identifier.

2. The method of claim 1, wherein in terminating the old service access point identifier, the old service access point identifier is not terminated until after the period of time expires, wherein the period of time is predetermined to be long enough for the network to send to the new service access point a message providing compressions for the new service access point.

3. A method as in claim 1, wherein the timer period is set to approximately 15 seconds.

4. A computer program product comprising: a computer readable storage structure embodying computer program code thereon for execution by a computer processor in a user equipment device, with said computer program code characterized in that it includes instructions for performing the method of claim 1.

5. A method, as in claim 1, wherein the indication of a change from the old service access point identifier to the new service access point identifier is provided by a packet data protocol context modify request.

6. A method, as in claim 5, wherein the timer is set by a subnetwork dependent convergence protocol layer of the user equipment device in response to an subnetwork session management modify indication message issued by a session management entity of the user equipment device in response to the packet data protocol context modify request.

7. A user equipment device enabled for communication with other telecommunication devices via a network including a radio access network and providing general packet radio service, the user equipment device adapted for responding to a message from the network indicating a change in a service access point identifier connection from an old service access point identifier to a new service access point identifier, the user equipment device comprising:
   means, responsive to an indication from the network of a change from the old service access point identifier to the new service access point identifier, for setting a timer for a period of time; and
   means for terminating the old service access point identifier.

8. The user equipment device of claim 7, wherein the means for terminating the old service access point identifier is so adapted that the old service access point identifier is not terminated until after the period of time expires, and wherein the period of time is predetermined to be long enough for the network to send to the new service access point a message providing compressions for the new service access point.

9. A telecommunication system, comprising a user equipment device and a network including a radio access network and providing general packet radio service, wherein the user equipment device is as claimed in claim 5.

10. A user equipment device as in claim 7, wherein the indication of a change from the old service access point identifier to the new service access point identifier is included in a packet data protocol context modify request.

11. A user equipment device as in claim 10, further comprising a session management entity and a subnetwork dependent convergence protocol layer, and the subnetwork dependent convergence protocol layer is configured to set a timer in response to a subnetwork session management modify indication message issued by the session management entity in response to the packet data protocol context modify request.

12. A method for use by a telecommunication network in communicating with a user equipment device enabled for communication with other telecommunication devices, the network including a radio access network and providing general packet radio service, the method for use in indicating to the user equipment device a change in a service access point identifier connection from an old service access point identifier to a new service access point identifier, the method including:
   providing to the user equipment device a request to change to the new service access point identifier;
   removing compressions from the old service access point identifier; and
   providing compressions for the new service access point identifier;
   wherein the network continues to provide messages for the old service access point identifier after providing to the user equipment device the request to change to the new service access point identifier and also provides the messages for the new service access point identifier.

13. A method as in claim 12, wherein the request to change to the new service access point identifier is included in a packet data protocol context modify request.

14. A telecommunication network adapted for communicating with a user equipment device, the network including a radio access network and providing general packet radio service, the telecommunication network adapted for indicating to the user equipment device a change in a service access point identifier connection from an old service access point identifier to a new service access point identifier, the telecommunication network including:
   means for providing to the user equipment device a request to change to the new service access point identifier;
   means for removing compressions from the old service access point identifier; and
   means for providing compressions for the new service access point identifier;
   wherein the network is configured to continue to provide messages for the old service access point identifier after providing to the user equipment device the request to change to the new service access point identifier and also to provide the messages for the new service access point identifier.

15. A system, comprising a user equipment device and a telecommunication network including a radio access network and providing general packet radio service, wherein the telecommunication network is as in claim 14.

16. A telecommunication network as in claim 14, wherein the request to change to the new service access point identifier is included in a packet data protocol context modify request.

17. A user equipment device enabled for communication with other telecommunication devices via a network including a radio access network and providing general packet radio service, the user equipment device adapted for responding to a message from the network indicating a change in a service access point identifier connection from an old service access point identifier to a new service access point identifier, the user equipment device comprising a subnetwork dependent convergence protocol configured to:
  receive an indication from the network of a change from the old service access point identifier to the new service access point identifier, and then set a timer for a period of time; and
  terminate the old service access point identifier.

18. The user equipment device of claim 17, wherein the subnetwork dependent convergence protocol is so adapted that the old service access point identifier is not terminated until after the period of time expires, and wherein the period of time is predetermined to be long enough for the network to send to the new service access point a message providing compressions for the new service access point.

19. A user equipment device as in claim 17, wherein the indication of a change from the old service access point identifier to the new service access point identifier is included in a packet data protocol context modify request.

20. A user equipment device as in claim 19, further comprising a session management entity and a subnetwork dependent convergence protocol layer, and the subnetwork dependent convergence protocol layer is configured to set a timer in response to a subnetwork session management modify indication message issued by the session management entity in response to the packet data protocol context modify request.

21. A telecommunication network adapted for communicating with a user equipment device, the network including a radio access network and providing general packet radio service, the telecommunication network adapted for indicating to the user equipment device a change in a service access point identifier connection from an old service access point identifier to a new service access point identifier, the telecommunication network comprising equipment configured to:
  provide to the user equipment device a request to change to the new service access point identifier;
  remove compressions from the old service access point identifier; and
  provide compressions for the new service access point identifier;
  wherein the equipment is further configured to continue to provide messages for the old service access point identifier after providing to the user equipment device the request to change to the new service access point identifier and also to provide the messages for the new service access point identifier.

22. A telecommunication network as in claim 21, wherein the request to change to the new service access point identifier is included in a packet data protocol context modify request.

* * * * *

UNITED STATES PATENT AND TRADEMARK OFFICE
CERTIFICATE OF CORRECTION

| | | |
|---|---|---|
| PATENT NO. | : 7,193,979 B2 | Page 1 of 1 |
| APPLICATION NO. | : 10/618266 | |
| DATED | : March 20, 2007 | |
| INVENTOR(S) | : Arto Suomi | |

It is certified that error appears in the above-identified patent and that said Letters Patent is hereby corrected as shown below:

In column 9, line 67, claim 8, line 11, please delete "5" and substitute -- 7 --.

Signed and Sealed this

Twenty-first Day of August, 2007

JON W. DUDAS
*Director of the United States Patent and Trademark Office*